2,710,850

CYANOACETIC ACID ESTER RESINS

Thomas Boyd, Springfield, Mass., assignor to Monsanto Chemical Company, St. Louis, Mo., a corporation of Delaware No Drawing. Application August 22, 1951,
Serial No. 243,182

8 Claims. (Cl. 260—67)

This invention relates to new thermosetting resins. More particularly the invention relates to resins derived from esters of cyanocarboxylic acids.

One object of this invention is to provide new thermosetting resins.

A further object is to provide resins derived from cyanocarboxylic acid esters.

Another object is to provide a process for preparing resins from cyanoacetic acid esters.

These and other objects are attained by reacting an ester of a cyanocarboxylic acid with hydrazine in an alcoholic solution and then reacting the product with an aldehyde or ketone. The products thus produced may be further reacted with alcohols or phenols.

The following examples are given in illustration and are not intended as limitations of the scope of this invention. Where parts are mentioned they are parts by weight.

Example I

Dissolve 10 parts of ethyl cyanoacetate and 80 parts of 85% hydrazine hydrate in 50 parts of ethanol. Heat at reflux temperature and atmospheric pressure for about 2 hours and cool. A precipitate forms which can be purified by crystallization from water. The crystals are in the form of glistening yellow platelets. The crystals decompose at elevated temperatures before they melt.

Example II

Dissolve 100 parts of the yellow platelets of Example I in 220 parts of formalin (37% formaldehyde). Heat the solution at 50° C. until the water and excess formaldehyde are removed. The product is a clear slightly yellow syrup. It is soluble in organic solvents. The syrup may be used directly as a coating or impregnating composition and films may be prepared from it by casting it on smooth surfaces. The syrup may then be cured to an insoluble infusible stage by heating it at 120 to 200° C. for a short time. The syrup may also be mixed with fillers to form a dry mix which may be molded at elevated temperatures and pressures.

A molding powder may be prepared by heating the syrup of Example II at 30 to 100° C. until it is partially cured to a hard brittle but still fusible stage. The resin may then be pulverized, compounded with conventional molding powder ingredients and molded under heat and pressure into infusible insoluble articles.

If the formalin of Example II is replaced by an aqueous solution containing 195 parts of methyl ethyl ketone, similar results are obtained.

Example III

Dissolve 100 parts of the syrup obtained in Example II in 100 parts of methanol. Heat the solution at reflux temperature and atmospheric pressure for about 30 minutes and then cool to room temperature. The product is a methanol solution of the methyl ether of the product obtained in Example II.

The solution may be used directly for impregnating, coating and casting purposes or the excess methanol may be removed prior to such uses. The methyl ether is a sirupy liquid which may be cured to a solid insoluble infusible state by heating it at 120 to 200° C. The solid is softer and tougher than the cured unmodified condensation product.

The preliminary reaction product is prepared by heat-reacting an ester of a cyanocarboxylic acid with hydrazine in alcoholic solution. For convenience, the ethyl ester is generally used since it is easily and economically prepared and is readily soluble in ethanol. Other esters may be used such as the methyl and other alkyl esters, aryl esters, etc. The cyanocarboxylic acid esters have the formula

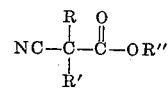

wherein R and R' may be hydrogen, alkyl, aryl, aralkyl or alkenyl groups and R'' may be an alkyl, aryl, aralkyl or alkenyl group. Examples of such substituent groups are methyl, ethyl, propyl, butyl, isobutyl, lauryl, phenyl, naphthyl, benzyl, phenethyl, allyl, methallyl, etc. groups.

The cyanoacyl ester is reacted with hydrazine, conveniently hydrazine hydrate in alcoholic solution. Ethanol is a convenient solvent but other alcohols such as methanol, cyclohexanol, benzyl alcohol, etc. may be used. The amount of hydrazine must be at least 1.25 mols per mol of cyanoacyl ester and may be as high as 2 mols per mol of ester. Any excess of hydrazine may be recovered after the reaction is complete.

The product of this reaction is not to be confused with cyanoacyl hydrazides which are crystalline products prepared in aqueous media by reacting together substantially equimolecular proportions of the cyanoacyl ester and hydrazine.

The aldehydes or ketones which may be condensed with the preliminary reaction product are aliphatic, aromatic, heterocyclic, etc. aldehydes or ketones which may be saturated or unsaturated and which may contain organic substituents such as alkoxy and aryloxy groups. If the aldehyde is water-soluble, the reaction may be carried out in an aqueous medium. Otherwise, an inert organic medium such as an aromatic aliphatic or halogenated hydrocarbon may be used. From 0.5 to 6 mols of aldehyde or ketone may be caused to condense with each mol of the preliminary reaction products. It is frequently desirable to use an excess of aldehyde to insure completion of the reaction in a relatively short time. The excess aldehyde may be removed after completion of the condensation reaction.

The condensation reaction may be carried out at temperatures ranging from 20 to 100° C. If the condensation is stopped when all the aldehyde or ketone possible has reacted, the products are either liquids or soft solids. However, the condensation reaction may be continued for a longer time resulting in the development of higher molecular weight materials which are hard brittle resins. These resins are still fusible and may be molded under heat and pressure into insoluble infusible articles.

The final curing of the resins to the insoluble state is generally carried out at 120 to 200° C.

No catalyst is necessary for the condensation reaction or the curing reaction. However either acid or alkaline catalysts may be used for the condensation reaction and acidic compounds are catalysts for the curing reaction.

For some purposes it is desirable to further react the soluble, fusible condensation products with an alcohol or phenol. The reaction is generally carried out in an excess of alcohol or phenol, said excess serving as a reaction medium and as a solvent for the product. If desired, an inert solvent such as an aliphatic, aromatic or halogenated hydrocarbon may be used. No catalyst is required but acid reacting compounds expedite the process. Aliphatic and aromatic alcohols and phenols may be used in this step. The alcohols or phenols may be saturated or unsaturated and they may contain substituents such as halogeno, nitro, cyano, amino, etc. groups. The amount of alcohol or phenol necessary for the reaction ranges from 0.1 to 1.0 mol per mol of aldehyde or ketone. However an excess of up to 5 mols per mol of aldehyde or ketone is frequently desirable.

The etherification reaction proceeds smoothly at temperatures ranging from 20 to 100° C. and may be carried out simultaneously with the condensation reaction between the aldehyde or ketone and the hydrazine-cyanoacetic ester reaction product. Since the latter is insoluble in alcohols the reaction takes place in slurry form. The etherification products are soluble, fusible materials. They are valuable in coating and impregnating compositions and may be cured to an insoluble infusible state by heating at 120 to 200° C.

It is obvious that variations may be made in the products and processes of this invention without departing from the spirit and scope thereof as defined in the appended claims.

What is claimed is:

1. A thermosetting resinous condensation product prepared by heating a mixture of from 0.5 to 6 mols of a carbonyl compound taken from the group consisting of formaldehyde and methyl ethyl ketone with 1 mol of the precipitate obtained by heating an alcoholic solution of 1 mol of an ester of cyanoacetic acid and from 1.25 to 2 mols of hydrazine, said ester having the formula

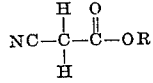

wherein R is taken from the group consisting of alkyl, aryl, aralkyl and alkenyl radicals.

2. A thermosetting resinous condensation product as in claim 1 wherein the ester of cyanoacetic acid is ethyl cyanoacetate.

3. A thermosetting resinous condensation product as in claim 1 wherein the carbonyl compound is formaldehyde.

4. A thermosetting resinous condensation ether prepared by forming a potentially reactive resin by heating a mixture of from 0.5 to 6 mols of a carbonyl compound taken from the group consisting of formaldehyde and methyl ethyl ketone with 1 mol of a precipitate obtained by heating an alcoholic solution of 1 mol of an ester of cyanoacetic acid and from 1.25 to 2 mols of hydrazine, and forming an ether by heating a mixture of said potentially reactive resin and from 0.1 to 1 mol, per mol of carbonyl compound used, of a hydroxyl compound taken from the group consisting of alcohols and phenols, said ester having the formula

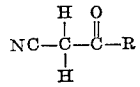

wherein R is taken from the group consisting of alkyl, aryl, aralkyl and alkenyl radicals.

5. An ether as in claim 4 wherein the ester of cyanoacetic acid is ethyl cyanoacetate.

6. An ether as in claim 4 wherein the carbonyl compound is formaldehyde.

7. An ether as in claim 4 wherein the hydroxyl compound is methanol.

8. An ether as in claim 4 wherein the ester of cyanoacetic acid is ethyl cyanoacetate, the carbonyl compound is formaldehyde and the hydroxyl compound is methanol.

References Cited in the file of this patent
UNITED STATES PATENTS 2,631,991     Boyd                 Mar. 17, 1953